United States Patent [19]
Okada et al.

[11] Patent Number: 5,608,633
[45] Date of Patent: Mar. 4, 1997

[54] SYSTEM AND METHOD FOR DETECTING KNOCKING FOR INTERNAL COMBUSTION ENGINE

[75] Inventors: Yoshihiro Okada, Yokohama; Shuhei Yamashita, Miura-gun, both of Japan

[73] Assignee: Nissan Motor Co., Ltd., Yokohama, Japan

[21] Appl. No.: 384,611

[22] Filed: Jan. 19, 1995

Related U.S. Application Data

[63] Continuation of Ser. No. 921,809, Jul. 29, 1992, abandoned.

[30] Foreign Application Priority Data

Jul. 29, 1991 [JP] Japan .................................. 3-188782
Jul. 29, 1991 [JP] Japan .................................. 3-188783

[51] Int. Cl.$^6$ ........................................................ F02P 5/14
[52] U.S. Cl. ........................... 364/431.08; 73/35.09; 123/425
[58] Field of Search ................. 364/431.08, 424.05, 364/508, 572, 574; 73/35; 123/425, 435

[56] References Cited

U.S. PATENT DOCUMENTS

| | | | |
|---|---|---|---|
| 4,356,551 | 10/1982 | Iwase et al. | 364/431.08 |
| 4,612,902 | 9/1986 | Abe et al. | 123/425 |
| 4,710,881 | 12/1987 | Mouri et al. | 364/431.08 |
| 4,750,103 | 6/1988 | Abo et al. | 364/431.08 |
| 4,899,710 | 2/1990 | Takahashi | 123/425 |
| 4,913,117 | 4/1990 | Hashimoto et al. | 123/425 |
| 4,943,776 | 7/1990 | Polito et al. | 73/35 |
| 4,969,440 | 11/1990 | Murakami et al. | 73/35 |
| 5,040,118 | 8/1991 | Diller | 364/424.05 |
| 5,052,214 | 10/1991 | Dils | 364/431.08 |
| 5,088,044 | 2/1992 | Matsuura | 364/431.08 |
| 5,115,779 | 5/1992 | Itoyama | 123/425 |
| 5,201,292 | 4/1993 | Grajski et al. | 73/35 |
| 5,230,316 | 7/1993 | Ichihara et al. | 123/425 |
| 5,361,213 | 11/1994 | Fujieda et al. | 364/431.08 |

FOREIGN PATENT DOCUMENTS 58-105036  6/1983  Japan .

*Primary Examiner*—Kevin J. Teska
*Assistant Examiner*—Tyrone V. Walker
*Attorney, Agent, or Firm*—Foley & Lardner

[57] ABSTRACT

A system and method for detecting and determining an engine knocking for an internal combustion engine are disclosed in which a whole frequency band of an engine vibration detection signal derived from piezoelectric element type knocking sensor is divided into a plurality of frequency regions or bands, the vibration levels indicated by the respective frequency signal components or the vibration detection signal and extracted according to the respective frequency bands are compared with threshold levels. According to a result of comparisons, the knocking detecting and determining system determines an occurrence of engine knocking.

38 Claims, 11 Drawing Sheets

(A)

(B)

(C)

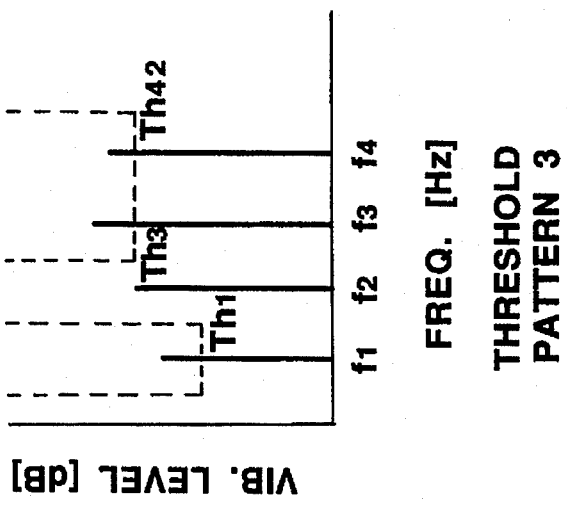
FIG.11(C) THRESHOLD PATTERN 3
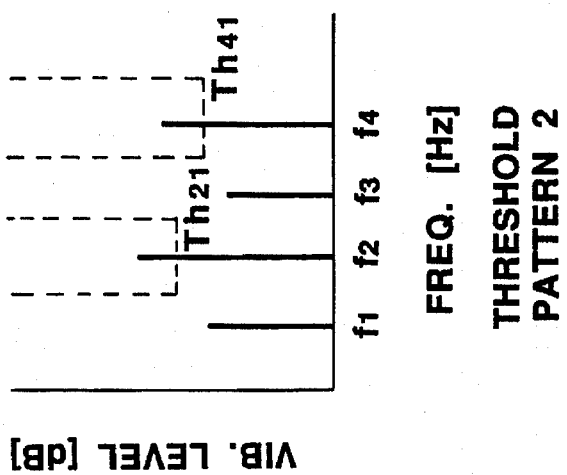
FIG.11(B) THRESHOLD PATTERN 2
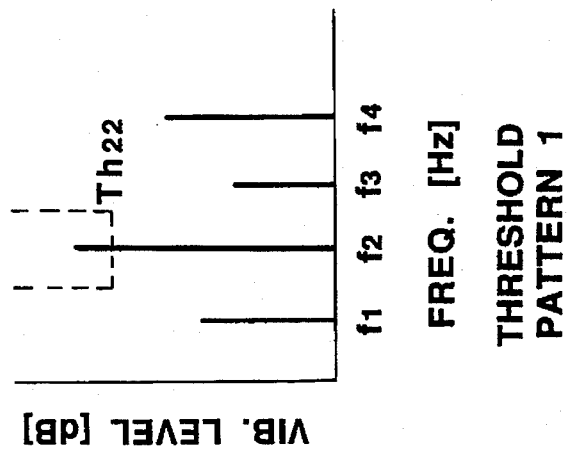
FIG.11(A) THRESHOLD PATTERN 1

SYSTEM AND METHOD FOR DETECTING KNOCKING FOR INTERNAL COMBUSTION ENGINE

This application is a continuation of application Ser. No. 07/921,809, filed Jul. 29, 1992, now abandoned.

BACKGROUND OF THE INVENTION

1. Field of the Invention

The present invention relates generally to a system and method for detecting an engine knocking for an internal combustion engine and, more particularly, relates to a system and method for detecting the knocking for the internal combustion engine according to frequency signal components of detection signals derived from knocking sensor(s) and generated on the basis of engine vibrations.

2. Description of the Background Art

A Japanese Patent Application First Publication No. Showa 58-105036 exemplifies a previously proposed ignition timing controlling system which avoids an occurrence of knocking speedily by correcting an ignition timing for respective spark plugs installed in respective engine cylinders upon detection of knocking since an ill effect of knocking impulses on intake and exhaust gas valves and piston(s) is given to the respective cylinders as well as the reduction of output power.

The knocking detection due to the correction of ignition timing upon the generation of knocking occurrence is carried out as follows:

That is to say, knock sensors such as those constituted by piezoelectric elements are attached onto respective cylinder blocks of the engine and outputs detection signals indicating engine pressure vibration levels. The detection signals from the knock sensors are input to band pass filter circuits so as to pass the signal components whose frequencies are placed in the vicinity to central frequencies particular to the engine knocking, and, after half rectifications thereof are carried out, for a predetermined integration interval by means of an integrator (for example, ATDC (After Top Dead Center) 10°~60°) the half rectified detection signals are integrated. The integrated values are input to a microcomputer via an A/D converter. The microcomputer determines whether the knocking occurs for the respective engine cylinders on the basis of differences between the integrated values at the time of predicted occurrence of knockings and those at the time of no predicted occurrence of knockings (machine vibration levels).

In addition, another previously proposed engine knocking detecting system teaches that the knock sensors having resonance characteristics for a single frequency may be used in place of the band pass filter circuits described above.

It is generally known that vibrating waveforms of the knockings have such tendencies for their amplitudes to increase locally over predetermined intervals.

Therefore, in a region wherein the occurrence of the knocking is determined according to the integrated value only for a particular frequency signal component, it may erroneously be detected that the knocking has occurred even if an average of the individual vibration levels during the detection interval is increased due to any factor except the knocking.

Particularly, in a case where the difference between the integrated values at the times of occurrence of knocking and of no occurrence of knocking cannot sufficiently be secured in an engine operating region, a probability of erroneous detection of knockings becomes increased since no clear difference is present when the knocking occurs or when no knocking occurs, in the above-described case.

SUMMARY OF THE INVENTION

It is therefore a principal object of the present invention to provide an improved system and method for detecting an engine knocking for an internal combustion engine which can accurately detect the engine knocking even when detection signal levels derived from knock sensors are minor or low.

The above-described object can be achieved by providing a system for detecting and determining an engine knocking for an internal combustion engine, comprising: a) knocking vibration sensing means, installed on the engine, for sensing engine pressure vibrations and outputting an engine vibration detection signal indicative of the engine vibrations; b) first means for detecting an engine operating condition and deriving a predetermined interval of time in a combustion stroke of each engine cylinder on the basis of the detected engine operating condition; c) second means for extracting a vibration level for each frequency band from the engine vibration detection signal during the predetermined interval of time, a whole frequency band of a plurality of frequency signal components constituting the engine vibration detection signal being divided into a plurality of frequency bands; and d) third means for previously setting a threshold level for each frequency band and comparing the vibration level with the threshold level for each frequency band, said third means determining whether the engine knocking occurs according to a result of the comparison.

The above-described object can also be achieved by providing a system for detecting and determining an engine knocking for an internal combustion engine, comprising: a) knocking vibration sensing means, installed on the engine, for sensing engine vibrations and outputting an engine vibration detection signal indicative of the engine vibrations; b) first means for detecting an engine operating condition and deriving a predetermined interval of time in a combustion stroke of each engine cylinder; c) second means for extracting a vibration level for each frequency band from the engine vibration detection signal during the predetermined interval of time, a whole frequency band of a plurality of frequency signal components constituting the engine vibration detection signal being divided into a plurality of frequency bands; and d) third means for selecting some predetermined number of vibration levels for the prespective frequency bands from among the vibration levels and sets the selected vibration levels as second vibration levels and for comparing the third vibration level with a threshold level and determining whether the engine knocking occurs according to a result of comparison.

The above-described object can also be achieved by providing a system for detecting and determining an engine knocking for an internal combustion engine, comprising: a) knocking vibration sensing means, installed on the engine, for sensing engine vibrations and outputting an engine vibration detection signal indicative of the engine vibrations; b) first means for detecting an engine operating condition and deriving a predetermined interval of time in a combustion stroke of each engine cylinder; c) second means for extracting a vibration level for each frequency band from the engine vibration detection signal during the predetermined interval of time, a whole frequency band of a plurality of frequency signal components constituting the engine vibration detection signal being divided into a plurality of frequency bands; and d) third means for selecting some predetermined number of larger values of vibration levels for the prespective frequency bands from among the vibration levels and sets the selected vibration levels as second vibration levels and for adding all of the second vibration levels to provide a third vibration level and for comparing the third vibration level with a threshold level and determining whether the engine knocking occurs according to a result of comparison.

The above-described object can also be achieved by providing a method for detecting and determining an engine knocking for an internal combustion engine, comprising the steps of: a) sensing engine vibrations and outputting an engine vibration detection signal indicative of the engine vibrations; b) detecting an engine operating condition and deriving a predetermined interval of time in a combustion stroke of each engine cylinder on the basis of the detected engine operating condition; c) extracting a vibration level for each frequency band from the engine vibration detection signal during the predetermined interval of time, a whole frequency band of a plurality of frequency signal components constituting the engine vibration detection signal being divided into a plurality of frequency regions; and d) setting a threshold level for each frequency band and comparing the vibration level with the threshold level for each frequency band, said third means determining whether the engine knocking occurs according to a result of the comparison.

BRIEF DESCRIPTION OF THE DRAWINGS

FIGS. 11(A) through 11(C) are characteristic graphs representing various knocking determination patterns in the sixth preferred embodiment according to the present invention.

DESCRIPTION OF THE PREFERRED EMBODIMENTS

Reference will hereinafter be made to the drawings in order to facilitate a better understanding of the present invention.

(First Preferred Embodiment)

Figure 1:
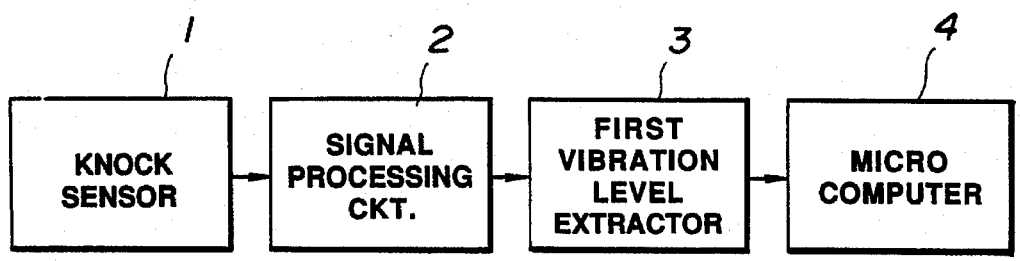
FIG. 1 is a circuit block diagram of a knocking detecting system for an internal combustion engine in a first preferred embodiment according to the present invention.

FIG. 1 shows a first preferred embodiment of a system for detecting engine knockings for an internal combustion engine.

It is noted that a conventional structure of the knocking detecting system is exemplified by the U.S. Pat. No. 4,750,103 issued on Jun. 7, 1988 which is herein incorporated by reference.

In FIG. 1, a knock sensor 1 is installed on a cylinder block of an internal combustion engine (not shown) and is constituted by a piezoelectric element which outputs a voltage signal whose waveform is varied according to the engine vibrations.

The detection (voltage, analog) signal derived from the knock sensor 1 is input to a signal processing circuit 2.

The signal processing circuit 2 adjusts an output gain and extracts only a signal level having a frequency falling in a predetermined frequency band in which the knocking occurs (for example, extracts a frequency component in the range from 5 KHz to 20 KHz by means of a combination of a high pass filter which extracts only the frequency components over 5 KHz and a low band pass filter which extracts only the frequency components below 20 KHz).

The output signal from the signal processing circuit 2 is input to a first vibration level extraction circuit 3.

The first vibration level extraction circuit 3 is constituted by a plurality of band pass filter circuits, a plurality of digital filter circuits (or a single comb filter), or software or hardware FFT (high speed (or Fast) Fourier Transform) frequency (spectrum) analyzer.

The individual vibration levels are extracted at the signal processing circuit for the respective frequency components (for example, in the first preferred embodiment, the number of divided frequency bands are five).

The output signal derived from the first vibration level extraction circuit 3 is supplied to a microcomputer 4 during a predetermined period of time at which each cylinder enters a combustion stroke (the control in the input interval of time may be carried out by the microcomputer 4 itself). The microcomputer 4 adds the vibration level for each frequency band to a weight coefficient for each frequency band so as to set a second vibration level.

In addition, the microcomputer 4 multiplies a background (BGL) defined by a weight mean of the second vibration level by a slice (or threshold) level, thus setting a determination level of the knocking.

When magnitudes of both second vibration level and determination (threshold) level are compared, the microcomputer 4 determines the occurrence of knocking according to the result of comparison of the magnitudes.

Figure 2:
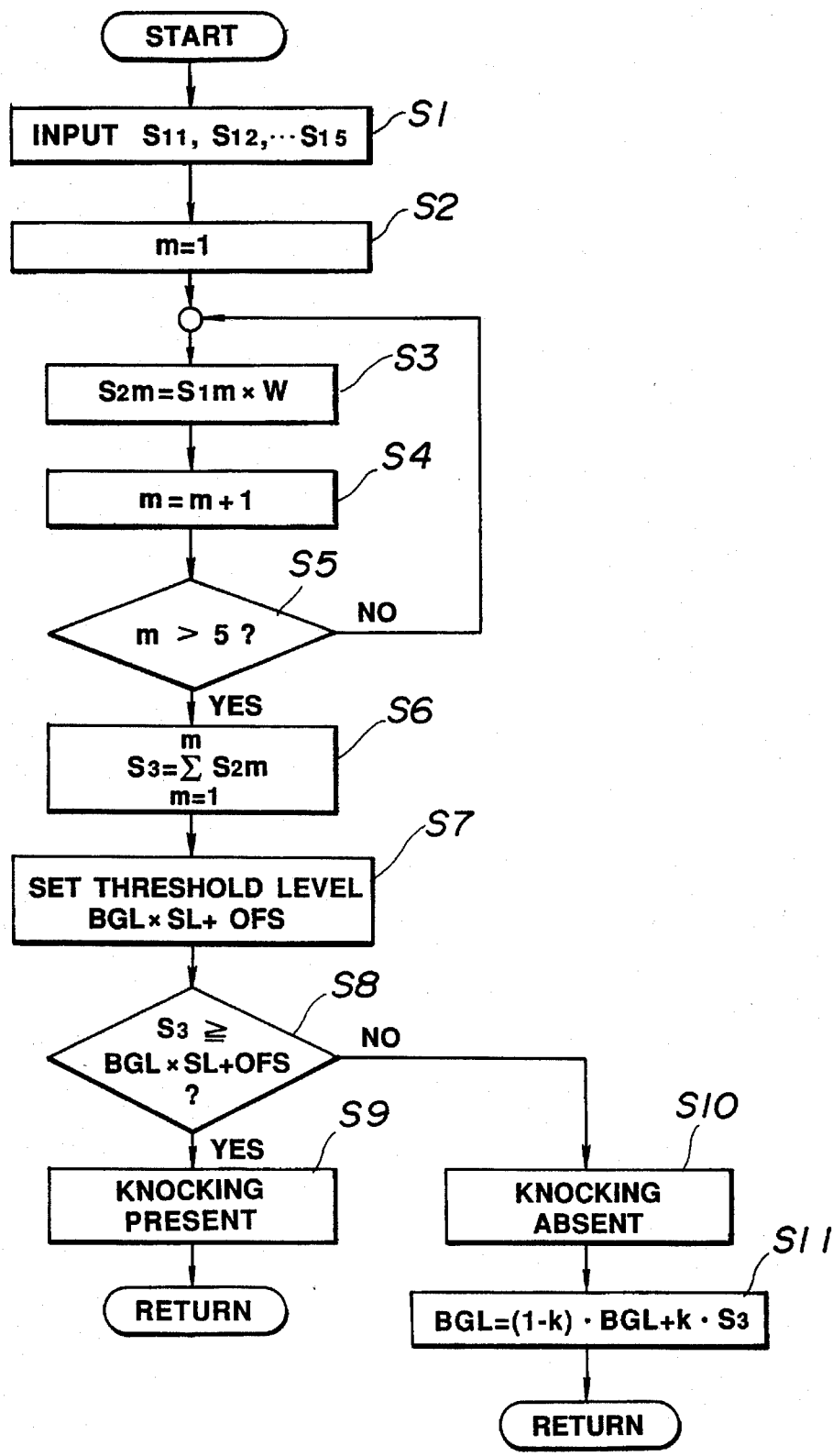
FIG. 2 is an operational flowchart executed by a microcomputer shown in FIG. 1 for explaining second and third vibration levels and determining knocking threshold vibration levels.

FIG. 2 shows the second vibration level and third vibration level setting and a knocking determination routines in the first preferred embodiment according to the present invention.

The microcomputer generally includes: a CPU (Central Processing Unit); a ROM (Read Only Memory); a RAM (Random Access Memory); common bus; and I/O interface.

In a first step S1 of FIG. 2, the CPU of the microcomputer reads the first vibration levels $S_{11}$~$S_{15}$ for the respective frequency bands from the first vibration level extraction circuit 3.

In a second step S2, the CPU sets a counter m to 1.

In a third step S3, the CPU sets the one vibration level $S_{1m}$ for the one frequency band m multiplied by a predetermined weight $W_m$ according to the frequency band m as the second vibration level $S_{2m}$.

Thus, if a value of the weight for one of the frequency bands in which a frequency of occurrence of the knocking is high (the number of times the knockings occur becomes increased) is set to a larger value, the vibration level at the time of knocking occurrence can be emphasized.

In a fourth step S4, the CPU counts up the counter m.

In a fifth step S5, the CPU determines whether the value of the counter m exceeds the number of frequency bands (=5). The routine returns to the step S3 until the counter value exceeds 5, thereby deriving $S_{2m}$ (m=1 through 5) for all frequency bands.

Next, in a sixth step S6, the CPU calculates a sum of the added values of all frequency components $S_{2m}$ (m=1 through 5) as a third vibration level $S_3$.

In a step S7, the CPU multiplies the weight mean value BGL between a previous value and present value of the third vibration level $S_3$ by a threshold value SL for the determination of the knocking and adds an offset value OFS to the multiplied value to set the actual threshold (determination) level.

As an engine revolution speed is increased, the magnitude of the knocking is accordingly increased. Therefore, the threshold value SL is set to a higher value according to the engine revolution speed, i.e., as the engine revolution speed is increased.

In addition, since when the engine revolution speed is low, the magnitude of the knocking is reduced and vibration level becomes smaller, the CPU adds the offset value OFS to the multiplied value as described above.

In a step S8, the CPU compares the third vibration level $S_3$ with the determination level (BGL×SL+OFS). It is noted that the determination level may be set as BGL+SL (SL may be set with the offset value OFS added thereto).

In the eighth step S8, when $S_3 \geq$ BGL×SL+OFS, the routine goes to a step S9 in which the CPU determines that the knocking has occurred.

If $S_3 <$ BGL×SL+OFS, the routine goes to a step S10 in which the CPU determines that no knocking occurs.

Furthermore, in a step S11, the CPU carries out the weight mean calculation from the weight mean value between the present third vibration level $S_3$ and the previous third vibration level $S_3$ with the weight with respect to the present value being set as k in order to carry out the next determination of the knocking (BGL=(1−k)·BGL+k·$S_3$).

The result of the weight means calculation in the step S11 is used to update the BGL.

In this way, the CPU compares the threshold value with a value to which the weight is added for each frequency component so as to determine the occurrence of knocking, the weight $W_m$ being larger as the magnitude by which the vibration level contributes to the occurrence of knocking becomes larger.

The accuracy of knocking determination can, thus, be improved.

(Second Preferred Embodiment)

Figure 3:
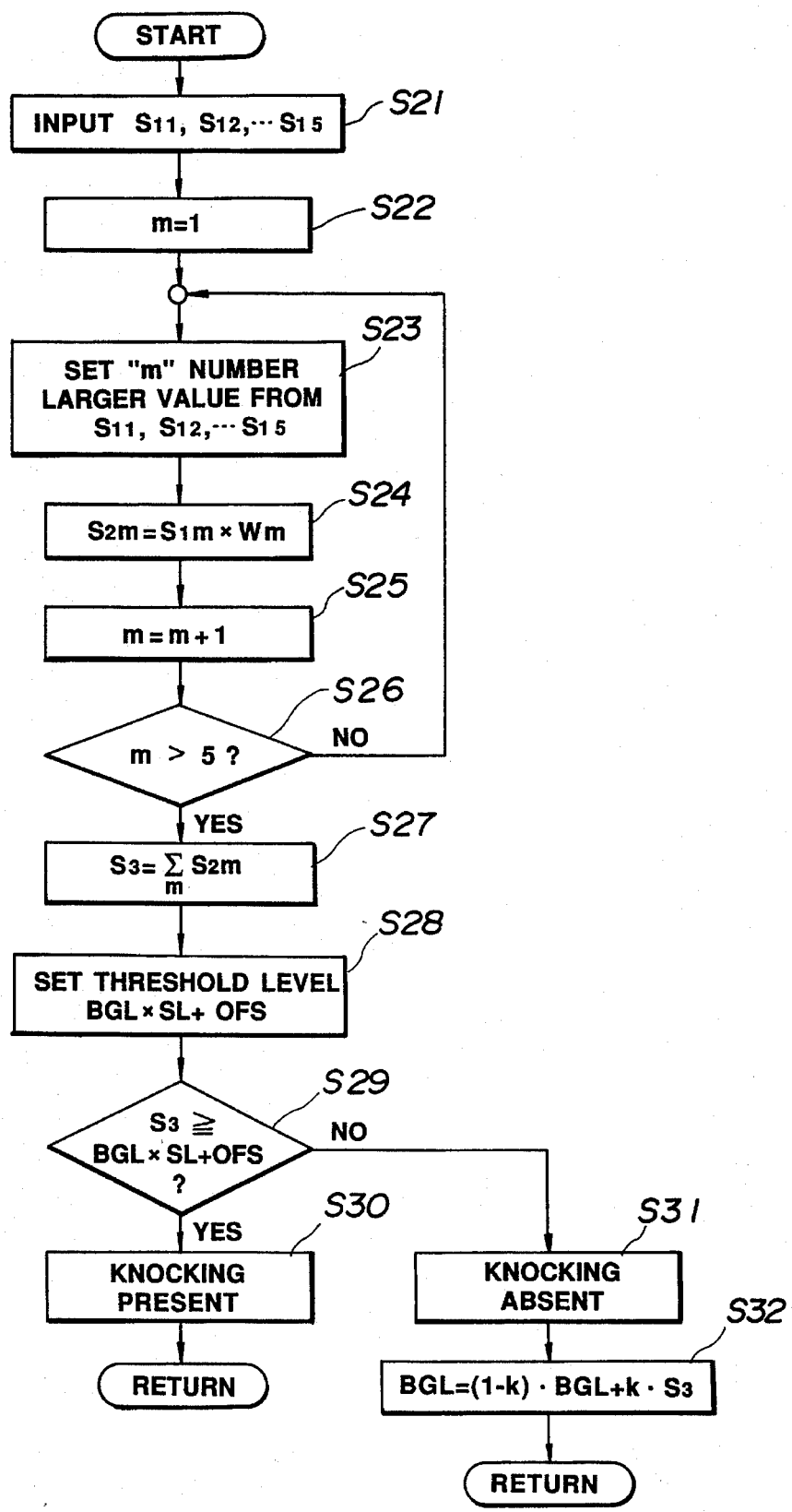
FIG. 3 is an operational flowchart executed by the microcomputer for explaining second and third vibration levels in a second preferred embodiment according to the present invention.

FIG. 3 shows the series of routine of setting the second vibration level and third vibration level and knocking determination in a second preferred embodiment of the knocking detecting system according to the present invention. In the second preferred embodiment, the setting of the weight is different from the first preferred embodiment.

In FIG. 3, steps S21 and S22 are the same as those steps of S1 and S2 in FIG. 2.

In a step S23, the CPU sets again m number of values $S_{1m}$ from among the m number of values of the vibration levels $S_{11}$ through $S_{15}$ for the respective frequency components which are larger than the other vibration levels.

In a step S24, the CPU sets the value multiplied by the weight $W_m$ with respect to $S_{1m}$ as the second vibration level $S_{2m}$. It is noted that the weight $W_m$ is set to become larger as a subscript m becomes minor. Hence, as the vibration level becomes larger, the larger weight is added.

It is noted that steps S25 through S32 are the same as those steps of S4 through S11 in the first preferred embodiment.

Since the level at the particular frequency component is particularly large as compared with those levels of the other frequency components as the feature of the vibration at the time of occurrence of knocking, the value to which a larger weight is added is set as the second vibration level. The information transmission of the occurrence of knocking can be facilitated and, therefore, the high accuracy of detection of knocking can be improved.

(Third Preferred Embodiment)

Figure 4:
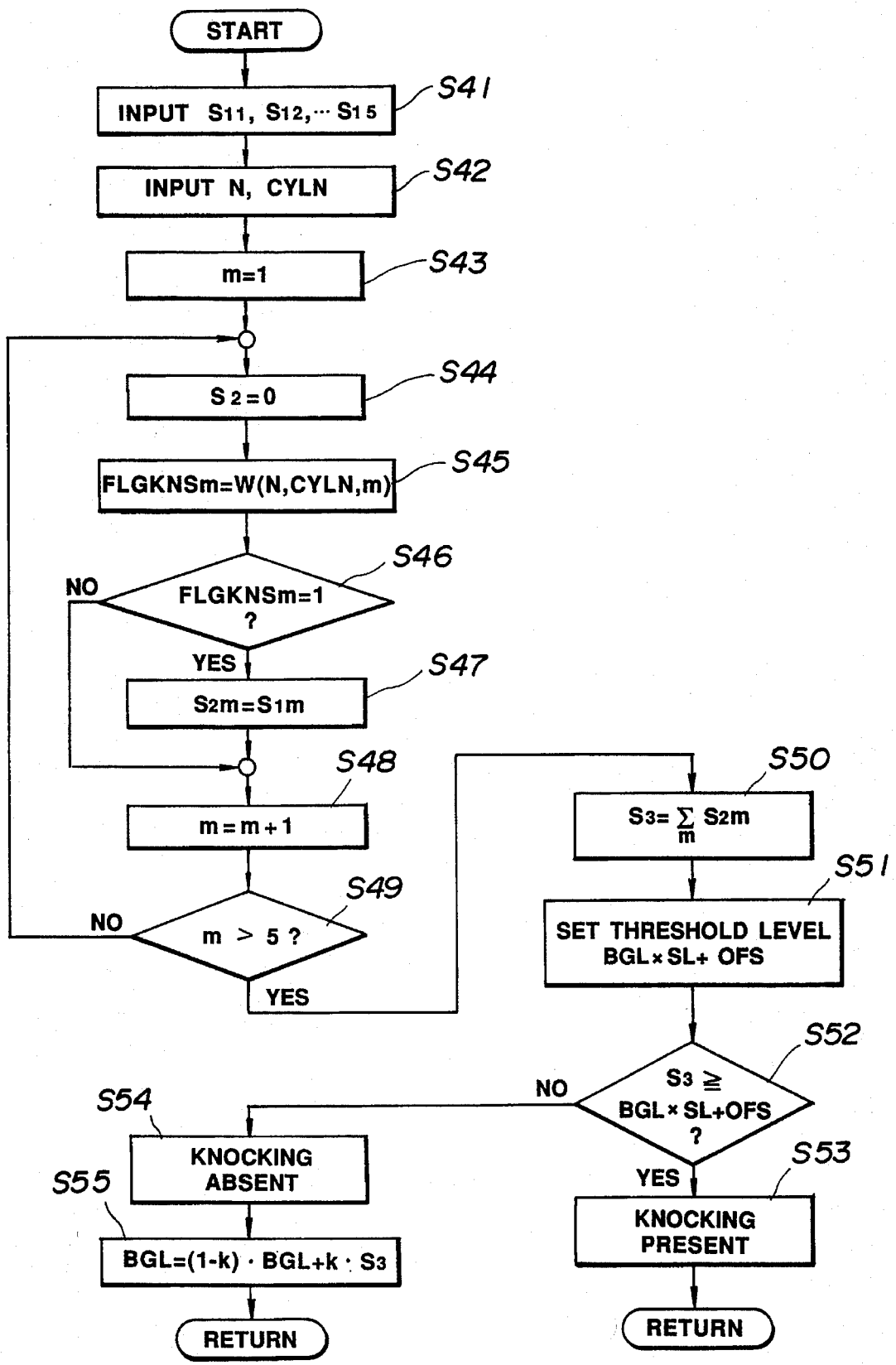
FIG. 4 is an operational flowchart executed by the microcomputer for explaining second and third vibration levels in a third preferred embodiment according to the present invention.

FIG. 4 shows the series of a routine of setting the second and third vibration levels and knocking determination in a third preferred embodiment of the knocking detecting system according to the present invention.

In a step S41, the CPU inputs the vibration levels $S_{11}$ through $S_{15}$.

In a step S42, the CPU detects an engine revolution speed N detected by means of a crank angle sensor (not shown) and detects the engine cylinder number in which the knock sensor 1 detects the vibration, i.e., the engine cylinder number which enters the combustion stroke on the basis of a cylinder number identification signal output from the crank angle sensor.

In a step S43, the CPU sets the counter m to 1 and, thereafter, in a step S44, the CPU sets the second vibration level $S_{2m}$ for the frequency component m to "0".

In a step S45, the CPU selects the engine revolution speed N detected, the engine cylinder number CYLN, and the vibration level m having the large degree to which the vibration level contributes to the occurrence of knocking as the second vibration level which is used to set the third vibration level. Therefore, a flag $FLGKNS_m$ indicative thereof is set to 1. The vibration level having less degree by which the knocking is concerned is not selected as the second vibration level. At this time, the flag $FLGKNS_m$ is set to 0.

Which vibration level is used is different according to the engine model and attaching position of the knocking sensor. In this case, experiments thereof may be carried out.

In a step S46, the CPU determines the value of the flag $FLGKNS_m$. If it indicates 1, the routine goes to a step S47. In the step S47, the CPU sets $S_{1m}$ as the second vibration level since the first vibration level $S_{1m}$ for the frequency component m is set as the second vibration level $S_{2m}$. Thereafter, the routine goes to a step S49. If the value of the flag $FLGKNS_m$ indicates zero, the routine jumps over the step S47 to the step S48 since the first vibration level is not selected as the second vibration level.

In the step S48, the CPU counts up the value of m. If m>5 (the number of frequency bands) in the step S49, the routine goes to a step S50.

Until m>5, the routine returns to the step S44 so that all of the second vibration levels S2m used to set the third vibration level are selected.

The setting of the third vibration level in the step S50 and knocking determination in steps S51 through S55 are carried out in the same way as in the other preferred embodiments. However, in the step S50, the predetermined numbers of the second vibration levels S2m less than the number of the frequency bands are added.

In the third preferred embodiment, the frequency band in which the level of the knocking is large is different according to the engine operating condition and the level thereof is different according to the engine cylinders. With these factors as described above in mind, the frequency band to be selected is determined so as to improve the knocking determination accuracy.

(Fourth Preferred Embodiment)

Figure 5:
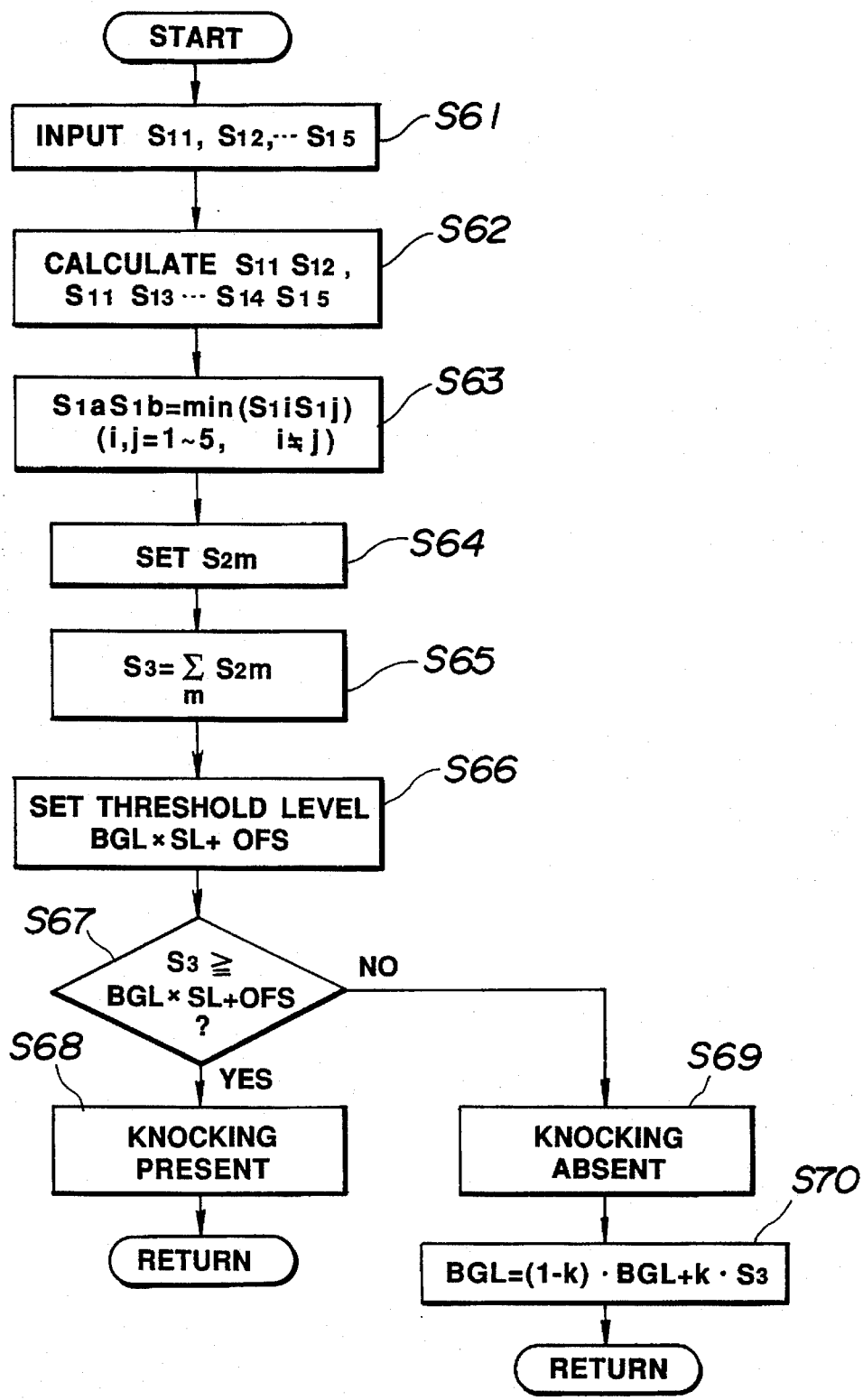
FIG. 5 is an operational flowchart executed by the microcomputer for explaining second and third vibration levels in a fourth preferred embodiment according to the present invention.

FIG. 5 shows the series of a routine for setting the second vibration levels and third vibration levels and knocking determination in a fourth preferred embodiment according to the present invention.

In a step S61, the CPU reads the first vibration levels $S_{11}$ through $S_{15}$.

In steps S62 through S64, the CPU selects larger three of the first vibration levels $S_{11}$ through S15 as the second vibration levels $S_{2m}$ (m=1 through 3).

In details, in the step S62, the CPU calculates a total of ten combinations of each two of the five first vibration levels $S_{11}$ through $S_{15}(S_{11}, S_{12}), (S_{11}, S_{13}), \ldots (S_{14}, S_{15})$ to derive products of $S_{11}S_{12}, S_{11}S_{13}, \ldots, S_{14}S_{15}$.

In the step S63, the CPU derives a least product from among the products.

This can be carried out by comparing any one of the products with any other one product and selecting the larger product and comparing any other product with any other product, sequentially, until the four comparisons are carried out.

Suppose that the least product is $S_{1a}S_{1b}$. At this time, since $S_{1a}$ and $S_{1b}$ are the first and second east values from among $S_{11}$ through $S_{15}$, the other three values can be selected as the highest order three values in the step S64.

In steps S65 through S70, the second vibration levels $S_m$ (m=1 through 3) selected are added to derive the third vibration level $S_3$.

The determination of the presence or absence of the knocking through the comparison with the threshold level is the same as in the case of the other preferred embodiments.

As described above, since the vibration levels at the particular frequency components are particularly large as compared with the levels at the other frequency components at the time of occurrence of knocking, the larger three of the first vibration levels are set as the second vibration levels and the added value is set as the third vibration level.

It is noted that if, in the third and fourth preferred embodiments, the respective weights are multiplied by the predetermined selected numbers of the first vibration levels to set the second vibration levels and these are added to set the third vibration levels, more highly accurate detection of knocking can be achieved.

(Fifth Preferred Embodiment)

Figure 6:
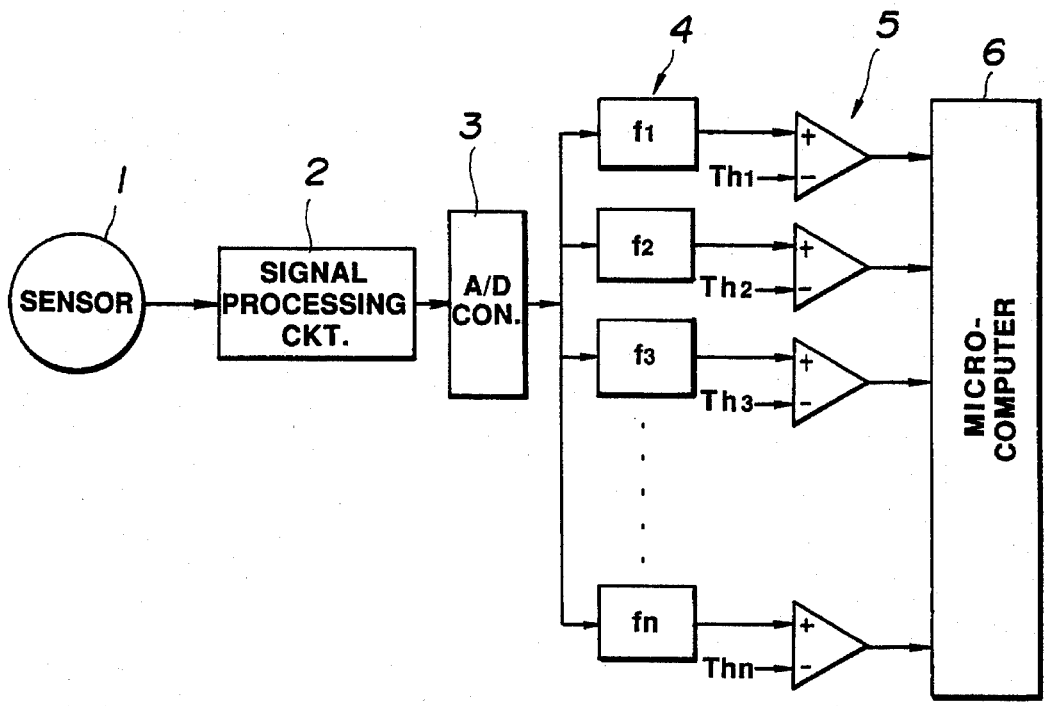
FIG. 6 is a circuit block diagram of the engine knocking detecting system in a fifth preferred embodiment according to the present invention.

FIG. 6 shows a fifth preferred embodiment of the engine knocking detecting system for the internal combustion engine according to the present invention.

It is noted that although a structure of the engine knocking detecting system is almost the same as that in the first preferred embodiment, a plurality of digital filters 44 are inserted between the A/D converter 33 and a plurality of comparators 55.

The output signal derived from the signal processing circuit 2 is A/D converted by means of the A/D converter and is input into the digital filters 4 whose numbers correspond to the divided plurality of frequency regions. These filter circuits 4 serve to extract the vibration levels for the respective frequency regions. It is noted that the digital filter circuits may be replaced with corresponding analog filter circuits. In this case, the A/D converter is not necessary. Alternatively, such a hardware or software frequency analyzer as the FFT may be used in place of the digital filter circuits.

Figure 7:
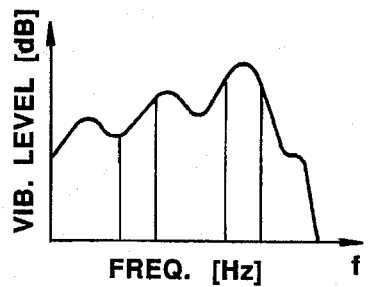
FIGS. 7(A), 7(B) and 7(C) are characteristic graphs representing various methods of detecting vibration levels in the fifth preferred embodiment shown in FIG. 6.
Figure 7:
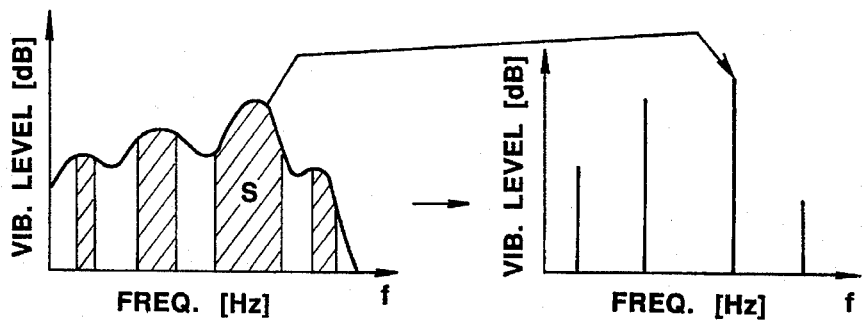
Figure 7:
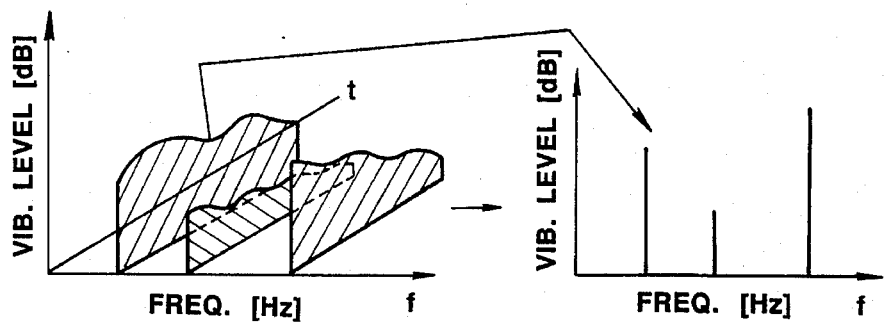

Then, the detection of vibration levels may be based on use of a maximum value of the amplitudes in the particular frequency component in the frequency band for each frequency band (as appreciated from FIG. 7(A)); based on the use of the detected maximum value of an area of both widths of the amplitude and of the frequency during the predetermined period of time (as appreciated from FIG. 7(B)); or alternatively based on the use of an integration value of the amplitudes and areas during the predetermined period of time with respect to time (as appreciated from FIG. 7(C)).

The output signal derived from each filter circuit 4 is input to a plus input terminal of each corresponding comparator 5 and is compared with each corresponding threshold level $Th_1$ through $Th_n$. Hence, the output of each comparator 5 is turned to a high level when each corresponding input vibration level exceeds the corresponding threshold level. When not exceeded, each comparator 5 outputs a low level.

The output signal from each comparator 5 is supplied to the microcomputer 6. The microcomputer 6 counts the number of the comparators 5 which indicate the high levels of their output signals. When the count values of the counter m exceed a predetermined number m, i.e., the vibration level input to the corresponding comparator 5 exceeds the threshold level, the microcomputer 6 determines the presence of the knocking. If not so, the microcomputer 6 determines the absence of the knocking. At this time, the microcomputer 6 executes the corresponding control.

In this way, when the vibration level for each frequency band is compared with the corresponding threshold level and the number of the vibration levels which exceed the corresponding threshold levels exceed the predetermined number, the improved accuracy of the knocking determination can be achieved as compared with the conventional knocking detecting system in which the knocking detection is carried out according to the total of the vibration levels.

Figure 8:
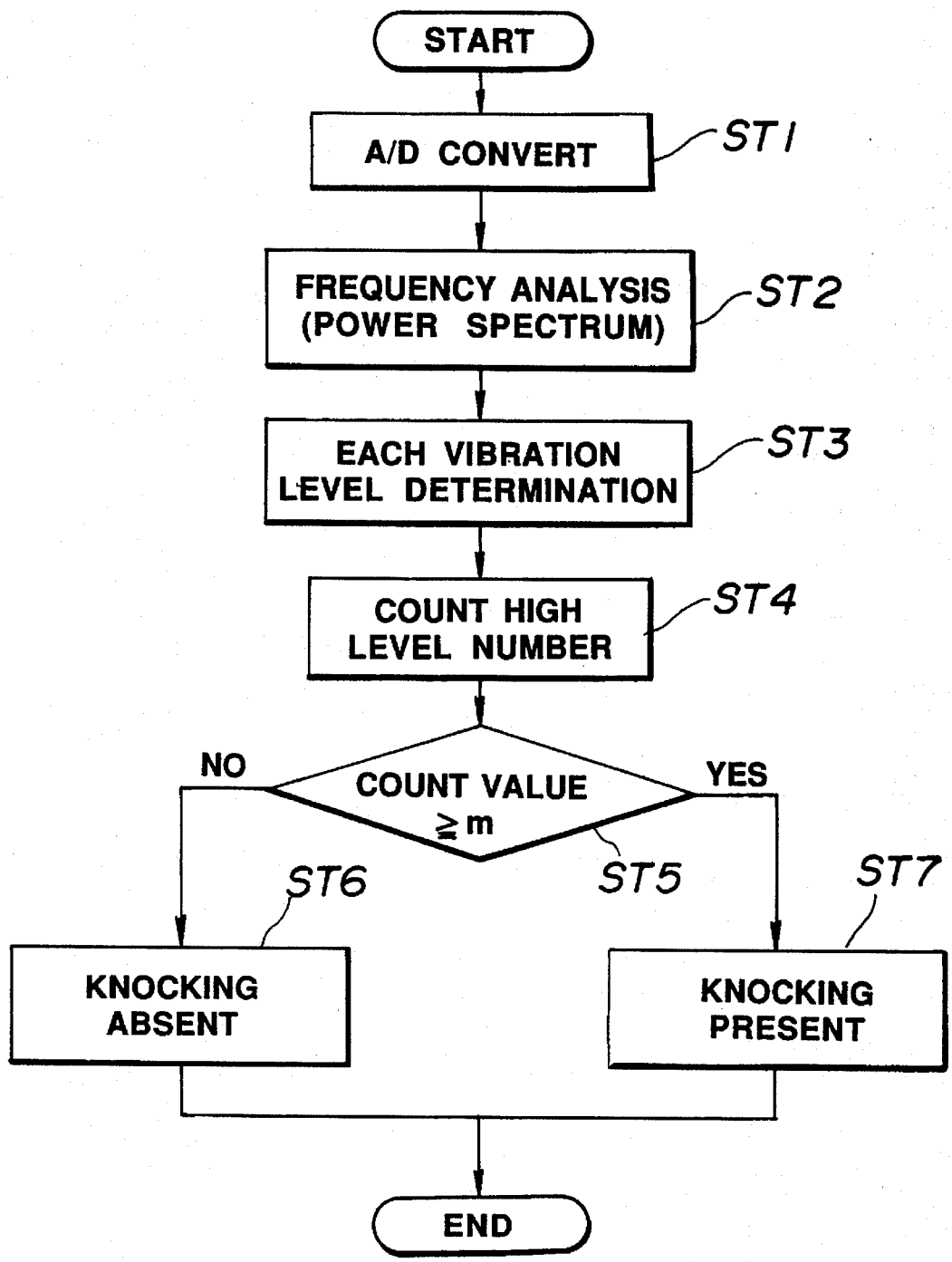
FIG. 8 is an operational flowchart executed by the microcomputer for explaining a knocking determination routine in the fifth preferred embodiment shown in FIG. 6.

FIG. 8 shows an operational flowchart indicating the routine of the knocking determination.

In a step ST1 of FIG. 8, the CPU reads the vibration levels through the A/D converter. In a step ST2, the digital circuits or frequency analyzer (FET) executes the frequency analysis, i.e., a power spectrum of the detected vibration level for the respective frequency regions. In a step ST3, each comparator 5 compares the vibration level with the corresponding threshold level $Th_1$ through $Th_n$ (n denotes an arbitrary integer). In a step ST4, the microcomputer 6 counts the number of the comparators which indicate the high levels of their output signals. In a step STS, the microcomputer 6 determines whether the number of the counts in the step ST4 exceed the predetermined number m. If count value is equal to or exceeds the predetermined number m, the microcomputer 6 determines that the knocking has occurred in a step ST7. If the count value is below the predetermined value m, the microcomputer 6 determines that no knocking occurs in a step ST6.

Figure 9:
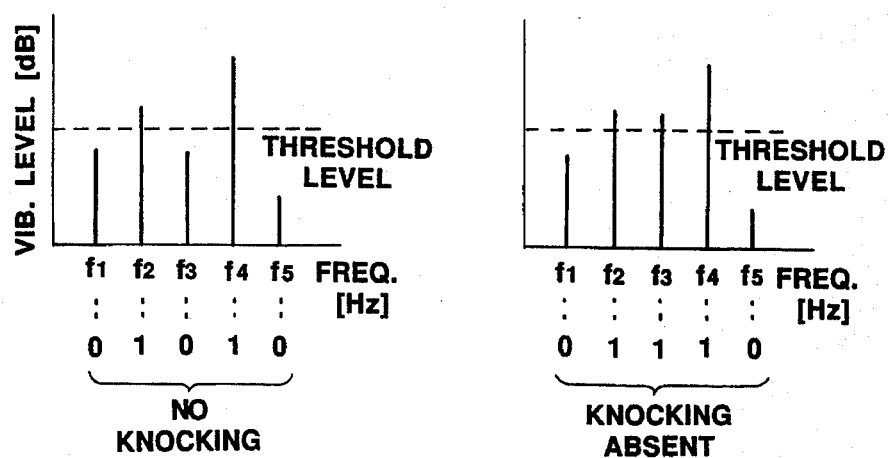
FIGS. 9(A) through 9(D) are characteristic graphs representing various threshold levels setting in the knocking determination in the fifth preferred embodiment.
Figure 9:
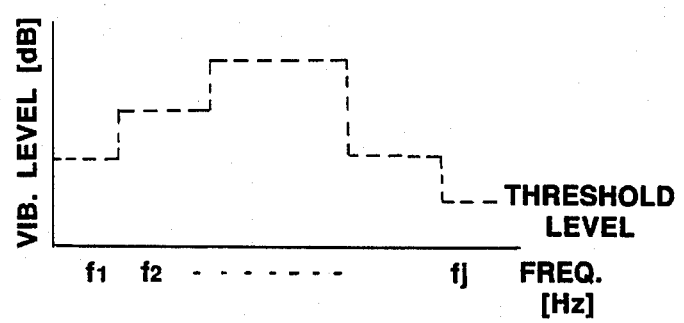
Figure 9:
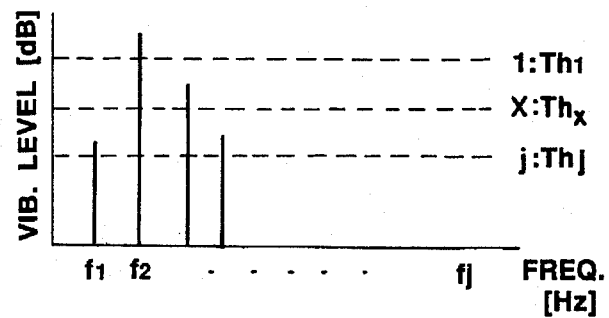
Figure 9:
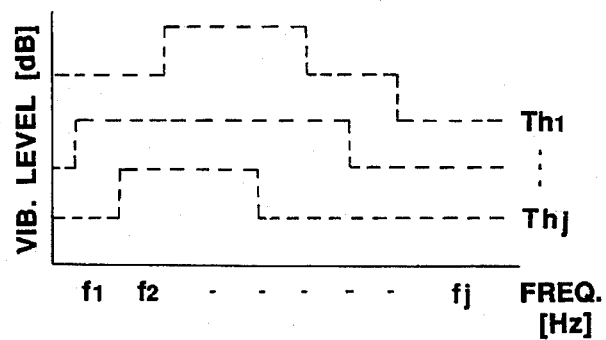

It is noted that, as appreciated from a broken line of FIG. 9(A), for the convenience purposes, each threshold level may be set to an equal value. Alternatively, each threshold level may be varied for each frequency band, as appreciated from a broken line of FIG. 9(B).

In addition, a plurality j of threshold levels $Th_1$ through $Th_j$ ($Th_1 > Th_2 > Th_3 > \ldots > Th_x > \ldots > \ldots ; Th_j$) may be set for each frequency band $f_x$ and the predetermined number m for the knocking determination may be varied for each threshold level $Th_x$ so as to set m=x. Then, when the number of the frequency regions which exceed the corresponding threshold level $Th_1$ through $Th_j$ exceeds the predetermined number m (=1 through j), the microcomputer 6 may determine that the knocking occurs. In this case, the threshold levels $Th_1$ through $Th_j$ may be set to a common value for all frequency regions (refer to FIG. 9(C)). However, the more accurate determination of the knocking can be achieved when the threshold levels $Th_1$ through $Th_j$ are variably set for each frequency band (refer to FIG. 9(D)).

Furthermore, in a case where the single knock sensor 1 is used to detect the vibration level for each cylinder, the threshold level and the predetermined number m may be set for each cylinder. That is to say, for any one of the engine cylinder which is adjacent to the position of the single knock sensor 1, the magnitudes of the threshold levels may be larger and, for any other cylinders which are far way from the position of the knock sensor 1, the magnitudes of the threshold levels may be reduced. Therefore, variations of the knocking determinations for the respective engine cylinders may be eliminated. Furthermore, since patterns of generating the knocking phenomena are different according to the engine operating condition, the threshold levels for the respective driving conditions may variably set according to the engine driving (operating) condition.

(Sixth Preferred Embodiment)

Figure 10:
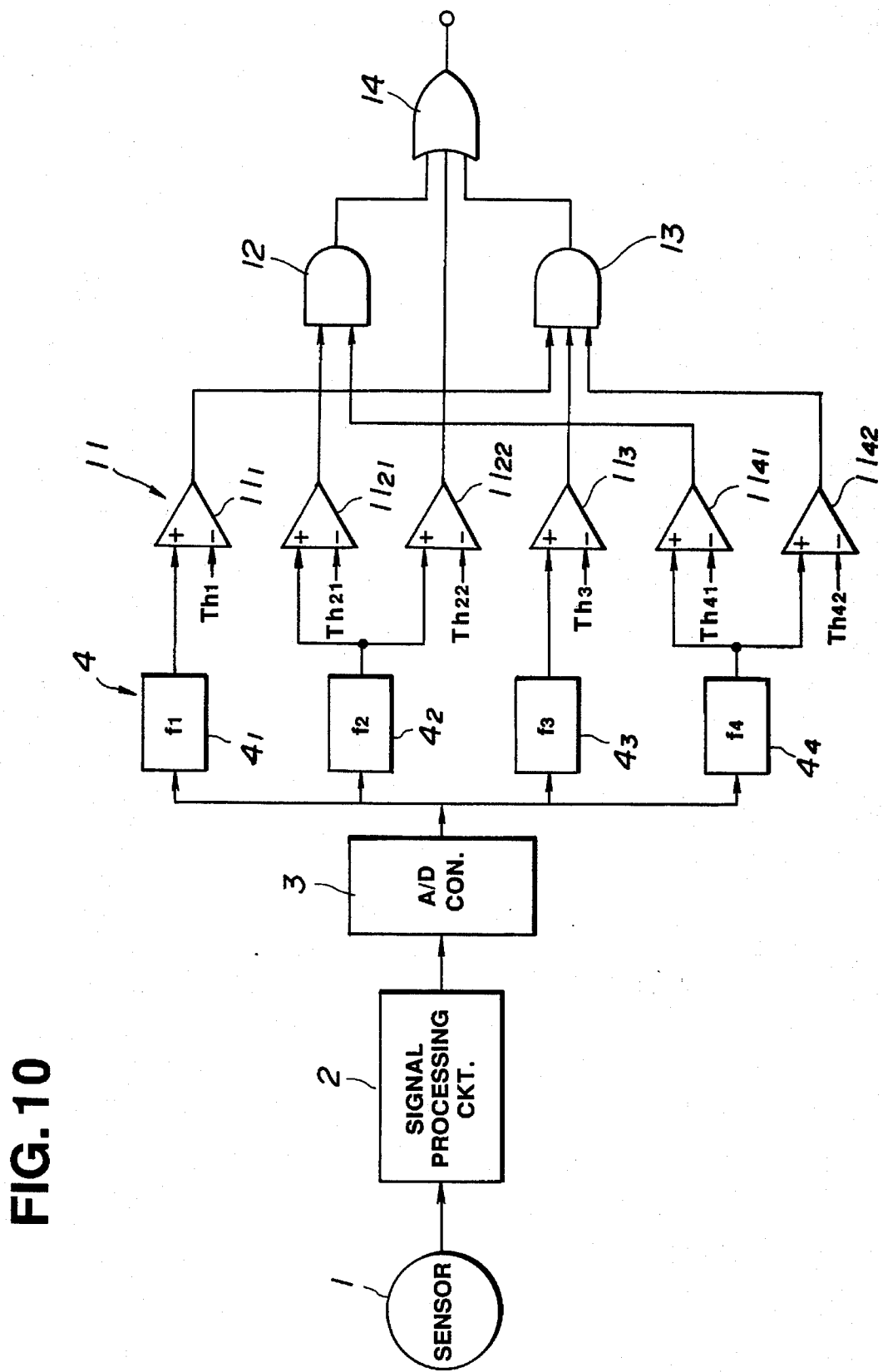
FIG. 10 is a circuit block diagram of the knocking detecting system in a sixth preferred embodiment according to the present invention.

FIG. 10 shows a sixth preferred embodiment of the engine knocking system for the internal combustion engine.

The structures of the knock sensor 1, the signal processing circuit 2, A/D converter 3, and digital filter circuit 4 are the same as those in the fifth preferred embodiment. However, the comparator $11_1$ is connected to the predetermined one of the digital filter circuits $4_1$ and the comparator $11_3$ is connected to the predetermined one of the digital filter circuits $4_3$. In addition, the two comparators $11_{21}$ and $11_{22}$ are connected to the one digital filter $4_2$ and the two comparators $11_{41}, 11_{42}$ are connected to the one digital filter $4_4$.

The output terminals of the one comparator $11_1$, comparator $11_3$, and comparator $11_{42}$ are connected to one of the two AND gate circuits 13. On the other hand, the one comparator $11_{21}$ and the comparator $11_{41}$ are connected to the other AND gate circuit 12. The output terminals of both AND gate circuits are connected to an OR circuit 14.

The threshold level $Th_{22}$ to be input to the comparator $11_{22}$ is highest of all other threshold levels. Each of the threshold levels $Th_3$ to be input to the comparator $11_3$ and $Th_{42}$ to be input to the comparator $11_{42}$ is second highest. The threshold level $Th_{21}$ to be input to the comparator $11_{21}$ is third highest. Each of the threshold levels $Th_1$ to be input to the comparator $11_1$ and $Th_{41}$ to be input to the comparator $11_{41}$ is lowest. In FIG. 10, symbols $f_1$ through $f_4$ denote the respective frequency bands.

When the output signal of the OR gate circuit 14 indicates the high level, the microcomputer 66 determines that the knocking is present. When the output signal of the OR gate circuit 14 indicates the low level, the microcomputer 66 determines that the knocking is absent.

FIGS. 11(A) through 11(B) show three patterns of the determinations of the knocking occurrence in the case of the sixth preferred embodiment shown in FIG. 10.

When any one of the conditions is satisfied, the microcomputer can determine that the knocking is present.

The conditions are as follows:

(1) When the vibration level of the frequency band $f_2$ exceeds the maximum threshold level $Th_{22}$ (refer to FIG. 11(A)).

(2) When the vibration level of the frequency band $f_2$ exceeds the third highest threshold level $Th_{21}$ and the vibration level of the frequency band $f_4$ exceeds the lowest threshold level $Th_{41}$ (refer to FIG. 11(B)).

(3) When the vibration level of the frequency band $f_1$ exceeds the lowest threshold level $Th_{42}$, the vibration level of the frequency band $f_3$ exceeds the second highest threshold level $Th_{42}$, and the vibration level of the frequency band $f_4$ exceeds the second highest threshold level $Th_{42}$ (refer to FIG. 11(C)).

Since the knockings have many frequency spectra patterns, the threshold levels are set according to the patterns of the combinations of frequency regions as described above. Therefore, various patterns of knocking determinations can be made.

Figure 12:
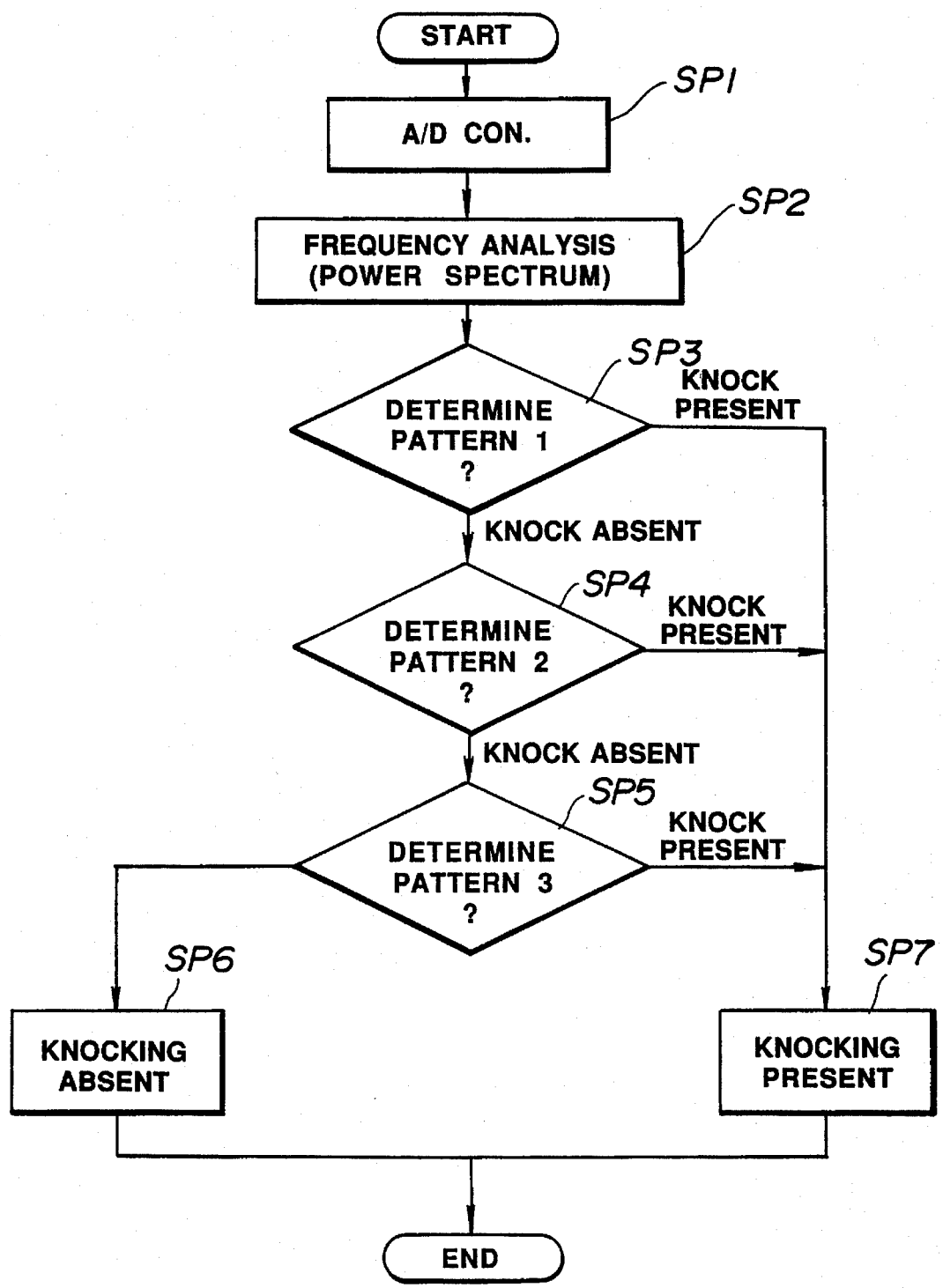
FIG. 12 is an operational flowchart of the knocking determination routine in the sixth preferred embodiment according to the present invention.

FIG. 12 shows the knocking determination routine described in the sixth preferred embodiment of the knocking detecting system.

In steps SP3 through SP5, the conditions described in the paragraphs (1) through (3) are established.

The other steps are same as in the case of the fifth preferred embodiment.

As described hereinabove, since, in the knocking detecting system according to the present invention, the weight is added to or multiplied by the first vibration level for each frequency band derived from the vibration level of the engine pressure vibration from the knocking sensor to set the second vibration level and this second vibration level is added together to set the third vibration level, it is possible to make the third vibration level larger during the occurrence of knocking. Therefore, the knocking detection accuracy can be improved.

Particularly, since the weight is previously set according to a magnitude by which the frequency signal component contributes to the occurrence of knocking, the weight is previously set larger when the first vibration level at the particular frequency band becomes large, and the weight is variably set according to at least one of the conditions of the engine operating condition and of one of the engine cylinders from which the engine vibration is detected. Thus, the third vibration level can be provided with the characteristic of the engine when the engine knocking occurs.

In addition, since, in the knocking detecting system and method according to the present invention, the predetermined number of first vibration levels is selected as the second vibration level, the determination routine of the knocking can be simplified.

In addition, since, in the knocking detecting system and method according to the present invention, in a case where those vibration levels that exceed the threshold levels are provided by more than the predetermined number, the system determines that the knocking occurs, the knocking accuracy which accords to the knocking characteristic can be improved.

Particularly, since the threshold level is previously and variably set according to the respective frequency bands, a plurality of threshold levels are set for the respective frequency bands, and the number of frequency bands for which the system determined whether the knocking occurs is variably set, the accuracy of determination of the knocking can be improved.

Furthermore, since, in the knocking detecting system and method according to the present invention, the threshold levels for the respective frequency bands are set according to the predetermined single frequency band or plurally combined frequency bands and when the vibration level or vibration levels for the single predetermined frequency band or all of the plurally combined frequency bands exceeds or exceed the corresponding threshold levels, the system can determine that the knocking is present, various patterns of the knocking determinations can be achieved.

The various effects that the knocking detecting system and method according to the present invention exhibit can be achieved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for detecting and determining an engine knocking for an internal combustion engine comprising:

a) knocking vibration sensing means, installed on the engine, for sensing engine vibrations and outputting an engine vibration detection signal indicative of the engine vibrations, said engine vibration detection signal being output during a predetermined interval of time in each combustion stroke of respective cylinders;

b) first means for extracting first vibration levels for a plurality of frequency components of the engine vibration detection signal and for generating second vibration levels corresponding thereto;

c) second means for deriving a sum of the second vibration levels of the respective frequency components as a third vibration level; and d) third means for comparing the sum derived by said second means with a preset threshold level and outputting a knock occurrence signal when said sum exceeds the threshold level;

wherein said first means comprises a plurality of bandpass filters connected in parallel to each other and connected to said knocking vibration sensing means;

wherein said threshold level is set using the following: $\{BGL \times SL + OFS\}$, wherein BGL denotes a weight mean value of a previous value and a present value of the third vibration level $S_3$, SL denotes a threshold value, and OFS denotes an offset quantity;

wherein said first means includes an engine crankshaft rotation sensor for detecting an engine revolution speed by detecting an engine crankshaft rotation and outputting a crank angle signal indicating the engine revolution speed and wherein said threshold value SL is set larger as the engine revolution speed is increased;

wherein said third means determines that the engine knocking occurs when the third vibration level $S_3$ equals or is larger than $\{BGL \times SL + OFS\}$; and wherein said third means determines that no knocking occurs when $S_3 < \{BGL \times SL + OFS\}$, and thereafter said third means calculates and updates the BGL as follows: $BGL = (1-k) \cdot BGL + k \cdot S_3$, wherein k denotes a weight coefficient of the present value of BGL with respect to the previous value of BGL.

2. A system for detecting and determining an engine knocking for an internal combustion engine as set forth in claim 1, wherein a weight $W_m$ by which the first vibration level for each frequency band is multiplied to set the second vibration level is variably set according to the individual frequency bands.

3. A system for detecting and determining an engine knocking for an internal combustion engine as set forth in claim 2, wherein said weight $W_m$ by which the first vibration level for each frequency band is multiplied to set the second vibration level becomes larger as a degree to which the first vibration level for each frequency band contributes to the occurrence of engine knocking becomes larger.

4. A system for detecting and determining an engine knocking for an internal combustion engine as set forth in claim 3, wherein said weight $W_m$ by which the first vibration level for each frequency band is multiplied to set the second vibration level is set to give a larger value to one of the first vibration level for a particular frequency band.

5. A system for detecting and determining an engine knocking for an internal combustion engine, comprising:

(a) knocking vibration sensing means, installed on the engine, for sensing engine vibrations and outputting an engine vibration detection signal indicative of the engine vibrations;

(b) first means for detecting an engine operating condition and deriving a predetermined interval of time in a combustion stroke of each engine cylinder;

(c) second means for extracting a plurality of first vibration levels from the engine vibration detection signal during the predetermined interval of time, each of said plurality of first vibration levels corresponding to vibration in one of a plurality of frequency bands;

(d) third means for weighting each of said plurality of first vibration levels to produce a plurality of second vibration levels;

(e) fourth means for generating a third vibration level $S_3$ as a sum of said second vibration levels;

(f) fifth means for comparing the third vibration level with a threshold level and for determining whether engine knocking occurs according to a result of comparison; and (g) sixth means for calculating products of combinations of two vibration levels as follows: $S_{11}S_{12}, S_{11}S_{13}, \ldots, S_{14}S_{15}$ from combinations of $(S_{11}, S_{12},), (S_{11}, S_{13}), \ldots, (S_{14}, S_{15})$, wherein $S_{11}$ through $S_{15}$ denote the first vibration levels for the respective frequency bands.

6. A system for detecting and determining an engine knocking for an internal combustion engine as set forth in claim 5, wherein the number of the frequency bands is five.

7. A system for detecting and determining an engine knocking for an internal combustion engine as set forth in claim 6, wherein said threshold level is set to a value common to each frequency band.

8. A system for detecting and determining an engine knocking for an internal combustion engine as set forth in claim 5, wherein said first means comprises a plurality of bandpass filters connected in parallel to each other and connected to said vibration sensing means.

9. A system for detecting and determining an engine knocking for an internal combustion engine as set forth in claim 8, wherein said threshold level is set as follows: BGL×SL+OFS, wherein BGL denotes a weight mean value of a previous value and present value of the third vibration level $S_3$, SL denotes a threshold value, and OFS denotes an offset quantity.

10. A system for detecting and determining an engine knocking for an internal combustion engine as set forth in claim 9, wherein said first means includes an engine crankshaft rotation sensor for detecting an engine revolution speed by detecting an engine crankshaft rotation and outputting a crank angle signal indicating the engine revolution speed and wherein said threshold value SL is set larger as the engine revolution speed is increased.

11. A system for detecting and determining an engine knocking for an internal combustion engine as set forth in claim 10, wherein said third means determines that the engine knocking occurs when the third vibration level $S_3$ equals or is larger than {BGL×SL+OFS}.

12. A system for detecting and determining an engine knocking for an internal combustion engine, comprising:

a) knocking vibration sensing means, installed on the engine, for sensing engine vibrations and outputting an engine vibration detection signal indicative of the engine vibrations, said engine vibration detection signal being output during a predetermined interval of time in each combustion stroke of respective cylinders;

b) first means for extracting vibration levels for respectively fixed frequency bands from said engine vibration detection signal;

c) second means for comparing respective threshold values previously set for the respective frequency bands with the respective vibration levels extracted by said first means for the respective frequency bands;

d) third means for counting the number of the comparison results by said second means which indicate that one corresponding vibration level exceeds the corresponding threshold value to produce a counted number and for outputting a knock occurrence signal when the counted number exceeds a predetermined number; and e) fourth means for adjusting an ignition timing for each engine cylinder according to the knock occurrence signal outputted by said third means.

13. A system for detecting and determining an engine knocking for an internal combustion engine, comprising:

a) knocking vibration sensing means, installed on the engine, for sensing engine vibrations and outputting an engine vibration detection signal indicative of the engine vibrations;

b) first means for detecting an engine operating condition and deriving a predetermined interval of time in a combustion stroke of each engine cylinder;

c) second means for extracting a vibration level for each frequency band from the engine vibration detection signal during the predetermined interval of time, a whole frequency band of a plurality of frequency signal components constituting the engine vibration detection signal being divided into a plurality of frequency bands; and d) third means for mutually comparing the vibration levels extracted by said second means, selecting some predetermined number of larger values of vibration levels from among the vibration levels, and for adding the selected vibration levels to produce a second vibration level; and e) fourth means for comparing the second vibration level with a threshold level and for determining whether engine knocking occurs according to a result of comparison.

14. A system for detecting and determining an engine knocking for an internal combustion engine as set forth in claim 13, wherein said knocking vibration sensing means comprises a piezoelectric sensor disposed on an outside surface of an engine body.

15. A system for detecting and determining an engine knocking for an internal combustion engine as set forth in claim 13, wherein a weight Wm, by which the vibration level for each frequency band extracted by said second means is multiplied, becomes larger as a degree to which the vibration level for each frequency band contributes to the occurrence of engine knocking becomes larger.

16. A system for detecting and determining an engine knocking for an internal combustion engine as set forth in claim 13, wherein a threshold level is different for each frequency band.

17. A system for detecting and determining an engine knocking for an internal combustion engine as set forth in claim 13, wherein a maximum value of areas formed between amplitudes and frequency widths in each frequency band during the predetermined interval of time is used for the vibration level derived for each frequency band extracted by said second means.

18. A system for detecting and determining an engine knocking for an internal combustion engine as set forth in claim 13, wherein an integrated value of either amplitude or areas formed between amplitudes and frequency widths in each frequency band during the predetermined interval of time with respect to time is used for the vibration level derived for each frequency band extracted by said second means.

19. A system for detecting and determining an engine knocking for an interval combustion engine as set forth in claim 13, which further comprises a means for adjusting an ignition timing for each engine cylinder according to a result of determination of occurrence of knocking by said fourth means.

20. A system for detecting and determining an engine knocking for an internal combustion engine, comprising:

a) knocking vibration sensing means, installed on the engine, for sensing engine vibrations and outputting an engine vibration detection signal indicative of the engine vibrations, said engine vibration detection signal being output during a predetermined interval of time in each combustion stroke of respective cylinders;

b) first means for extracting vibration levels for respectively fixed frequency bands from said engine vibration detection signal;

c) second means for comparing respective threshold values previously set for the respective frequency bands with the respective vibration levels extracted by said first means for the respective frequency bands; and d) third means for counting the number of the comparison results by said second means which indicate that one corresponding vibration level exceeds the corresponding threshold value to produce a counted number and for outputting a knock occurrence signal indicative of the occurrence of knocking when the counted number exceeds a predetermined number, said predetermined number being less than the number of said fixed frequency bands.

21. A system for detecting and determining an engine knocking for an internal combustion engine as set forth in claim 20, wherein said knocking vibration sensing means includes a piezoelectric sensor disposed on an outside surface of an engine body to detect the engine vibrations from engine pressure vibrations propagated to the piezoelectric sensor.

22. A system for detecting and determining an engine knocking for an internal combustion engine as set forth in claim 20, wherein said threshold values are equal for all of said frequency bands.

23. A system for detecting and determining an engine knocking for an internal combustion engine as set forth in claim 20, wherein said threshold values are varied for each of said frequency bands.

24. A system for detecting and determining an engine knocking for an internal combustion engine as set forth in claim 20, wherein said threshold values are different for each frequency band.

25. A system for detecting and determining an engine knocking for an internal combustion engine as set forth in claim 24, wherein said third means includes: fourth means for determining whether the vibration level for each frequency band extracted by the second means exceeds the threshold level set according to each frequency band; and fifth means for determining that the knocking occurs when the number of the vibration levels for the frequency bands which exceed the corresponding threshold levels exceeds a predetermined number.

26. A system for detecting and determining an engine knocking for an internal combustion engine as set forth in claim 24, wherein said third means includes: fourth means for setting the threshold level for a predetermined frequency band or the threshold levels for plurally combined frequency bands and for comparing the vibration level for the predetermined frequency band with the corresponding threshold level or the respective vibration levels with the threshold levels for the plurally combined frequency bands; and fifth means for determining that the knocking occurs when the vibration level for the predetermined frequency band exceeds the corresponding threshold level or all of the vibration levels for the plurally combined frequency bands exceed the corresponding threshold levels.

27. A system for detecting and determining an engine knocking for an internal combustion engine as set forth in claim 26, wherein said second means comprises: an Analog-to-Digital converter; a plurality of digital filters corresponding to the plurality of frequency bands and connected to said Analog-to-Digital converter.

28. A system for detecting and determining an engine knocking for an internal combustion engine as set forth in claim 27, wherein a maximum value of amplitudes of a particular frequency signal component in each frequency band during the predetermined interval of time is used for the vibration level derived for each digital filter circuit.

29. A system for detecting and determining an engine knocking for an internal combustion engine as set forth in claim 27, wherein a maximum value of areas formed between amplitudes and frequency widths in each frequency band during the predetermined interval of time is used for the vibration level derived for each digital filter circuit.

30. A system for detecting and determining an engine knocking for an internal combustion engine as set forth in claim 27, wherein an integrated value of either amplitude or areas formed between amplitudes and frequency widths in each frequency band during the predetermined interval of time with respect to time is used for the vibration level derived for each digital filter circuit.

31. A system for detecting and determining an engine knocking for an internal combustion engine as set forth in claim 27, wherein said third means includes a plurality of comparators connected to the respectively corresponding digital filter circuits.

32. A method for detecting and determining an engine knocking for an internal combustion engine, comprising the steps of:

a) sensing engine vibrations and outputting an engine vibration detection signal indicative of the engine vibrations;

b) detecting an engine operating condition and deriving a predetermined interval of time in a combustion stroke for each engine cylinder on the basis of the detected engine operating condition;

c) extracting a vibration level for each individually different and fixed frequency band of a plurality of individually different and fixed frequency bands from the engine vibration detection signal during the predetermined interval of time, a whole frequency band of a plurality of signal components constituting the engine vibration detection signal being divided into the plurality of the individually different and fixed frequency bands;

d) comparing respective threshold values previously set for the respective frequency bands with respective vibration levels extracted for the respective frequency bands at the step c); and e) counting the number of comparison results at the step d) which indicate that one corresponding vibration level exceeds a corresponding threshold value to produce a counted number and outputting a knock occurrence signal indicative of the occurrence of knocking when the counted number exceeds a predetermined number, said predetermined number being less than the number of said frequency bands.

33. A system for detecting and determining an engine knocking for an internal combustion engine, comprising:

a) knocking vibration sensing means, installed on the engine, for sensing engine vibrations and outputting an engine vibration detection signal indicative of the engine vibrations, said engine vibration detection signal being output during a predetermined interval of time in each combustion stroke of respective cylinders;

b) first means for extracting vibration levels for respectively fixed frequency bands from said engine vibration detection signal;

c) second means for comparing respective threshold values previously set for the respective frequency bands with the respective vibration levels extracted by said first means for the respective frequency bands; and d) third means for counting the number of the comparison results by said second means which indicate that one corresponding vibration level exceeds a corresponding threshold value to produce a counted number and for outputting a knock occurrence signal indicative of the occurrence of knocking when the counted number exceeds a predetermined number, said predetermined number being less than the number of said fixed frequency bands, and wherein said knocking vibration sensing means includes a piezoelectric sensor disposed on an outside surface of an engine body so as to detect the engine vibrations from engine pressure vibrations propagated thereonto.

34. A system for detecting and determining an engine knocking for an internal combustion engine, comprising:

a) knocking vibration sensing means, installed on the engine, for sensing engine vibrations and outputting an engine vibration detection signal indicative of the engine vibrations;

b) first means for detecting an engine operating condition and deriving a predetermined interval of time in a combustion stroke of each engine cylinder;

c) second means for extracting a first vibration level for each frequency band from the engine vibration detection signal during the predetermined interval of time, a whole frequency band of a plurality of frequency signal components constituting the engine vibration detection signal being divided into a plurality of fixed frequency bands; and d) third means for mutually comparing the vibration levels extracted by said second means, selecting some predetermined number of larger values of first vibration levels from among vibration levels extracted by said second means, and adding selected vibration levels to provide a second vibration level; and e) fourth means for comparing the second vibration level with a threshold level, and for determining whether engine knocking occurs according to a result of the comparison of the second vibration level with the threshold level, and wherein said knocking vibration sensing means comprises a piezoelectric sensor disposed on an outside surface of an engine body.

35. A system for detecting and determining an engine knocking for an internal combustion engine, comprising:

a) knocking vibration sensing means, installed on the engine, for sensing engine vibrations and outputting an engine vibration detection signal indicative of the engine vibrations, said engine vibration detection signal being output during a predetermined interval of time in each combustion stroke of respective cylinders;

b) first means for extracting vibration levels for respectively fixed frequency bands from said engine vibration detection signal;

c) second means for comparing respective threshold values previously set for the respective frequency bands with the respective vibration levels extracted by said first means for the respective frequency bands;

d) third means for counting the number of the comparison results by said second means which indicate that one corresponding vibration level exceeds the corresponding threshold value to produce a counted number and for outputting a knock occurrence signal indicative of the occurrence of knocking when the counted number exceeds a predetermined number, said predetermined number being less than the number of said fixed frequency bands;

e) fourth means for previously setting a plurality of threshold values ($Th_1$ through $T_j$) for each of the frequency bands ($f_1$ through $f_j$), each one ($Th_x$) of the threshold values ($Th_l$ through $Th_j$) having a value different from the other threshold values; and f) fifth means for setting said predetermined number such that said predetermined number has a plural number of predetermined numbers whose values correspond to respective threshold values, the values of said predetermined numbers indicating smaller values as said threshold values ($Th_l$ through $Th_j$) become larger.

36. A system for detecting and determining an engine knocking for an internal combustion engine, comprising:

a) knocking vibration sensing means, installed on the engine, for sensing engine vibrations and outputting an engine vibration detection signal indicative of the engine vibrations;

b) first means for detecting an engine operating condition and deriving a predetermined interval of time in a combustion stroke of each engine cylinder;

c) second means for extracting a vibration level for each frequency band from the engine vibration detection signal during the predetermined interval of time, a whole frequency band of a plurality of frequency signal components constituting the engine vibration detection signal being divided into a plurality of frequency bands; and d) third means for mutually comparing the vibration levels extracted by said second means, selecting some predetermined number of larger values of vibration levels from among the vibration levels, and for adding the selected vibration levels to produce a second vibration level; and e) fourth means for comparing the second vibration level with a threshold level and for determining whether engine knocking occurs according to a result of comparison;

wherein said threshold level is set using the following: {BGL×SL+OFS}, wherein BGL denotes a weight mean value of a previous value and a present value of a vibration level, SL denotes a threshold value, and OFS denotes an offset quantity.

37. A system for detecting and determining an engine knocking for an internal combustion engine, comprising:

a) knocking vibration sensing means, installed on the engine, for sensing engine vibrations and outputting an engine vibration detection signal indicative of the engine vibrations, said engine vibration detection signal being output during a predetermined interval of time in each combustion stroke of respective cylinders;

b) first means for extracting vibration levels for respectively fixed frequency bands from said engine vibration detection signal;

c) second means for comparing respective threshold values previously set for the respective frequency bands with the respective vibration levels extracted by said first means for the respective frequency bands; and d) third means for counting the number of the comparison results by said second means which indicate that one corresponding vibration level exceeds the corresponding threshold value to produce a counted number and for outputting a knock occurrence signal indicative of the occurrence of knocking when the counted number exceeds a predetermined number, said predetermined number being less than the number of said fixed frequency bands;

wherein said third means determines that the engine knocking occurs when a vibration level $S_3$ is equal to or larger than $\{BGL \times SL + OFS\}$, wherein BGL denotes a weight mean value of a previous value and a present value of a vibration level $S_3$, SL denotes a threshold value, and OFS denotes an offset quantity.

38. A system for detecting and determining an engine knocking for an internal combustion engine, comprising:

a) knocking vibration sensing means, installed on the engine, for sensing engine vibrations and outputting an engine vibration detection signal indicative of the engine vibrations;

b) first means for detecting an engine operating condition and deriving a predetermined interval of time in a combustion stroke of each engine cylinder;

c) second means for extracting a vibration level for each frequency band from the engine vibration detection signal during the predetermined interval of time, a whole frequency band of a plurality of frequency signal components constituting the engine vibration detection signal being divided into a plurality of frequency bands; and d) third means for mutually comparing the vibration levels extracted by said second means, selecting some predetermined number of larger values of vibration levels from among the vibration levels, and for adding the selected vibration levels to produce a second vibration level;

e) fourth means for comparing the second vibration level with a threshold level and for determining whether engine knocking occurs according to a result of comparison; and f) fifth means for calculating products of combinations of two of said vibration levels as follows: $S_{11}S_{12}$, $S_{11}S_{13}$, ..., $S_{14}S_{15}$ from combinations of $(S_{11}, S_{12})$, $(S_{11}, S_{13})$, ..., $(S_{14}, S_{15})$ so that larger values of said vibration levels are selected by said third means, wherein $S_{11}$ through $S_{15}$ denote values of the vibration levels for the respective frequency bands.

* * * * *